United States Patent
Yao et al.

(10) Patent No.: US 9,325,565 B2
(45) Date of Patent: Apr. 26, 2016

(54) CLOUD SERVICE PACKET REDIRECTION METHOD AND SYSTEM AND CLOUD GATEWAY

(71) Applicant: Huawei Technologies Co., Ltd., Shenzhen (CN)

(72) Inventors: Ziyang Yao, Nanjing (CN); Wei Zhang, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 281 days.

(21) Appl. No.: 14/046,579

(22) Filed: Oct. 4, 2013

(65) Prior Publication Data
US 2014/0136675 A1    May 15, 2014

(30) Foreign Application Priority Data
Nov. 12, 2012 (CN) .......................... 2012 1 0450183

(51) Int. Cl.
| H04L 12/24 | (2006.01) |
| H04L 29/08 | (2006.01) |
| H04L 12/725 | (2013.01) |
| H04L 29/12 | (2006.01) |

(52) U.S. Cl.
CPC .............. *H04L 41/00* (2013.01); *H04L 45/306* (2013.01); *H04L 67/1097* (2013.01); *H04L 61/1511* (2013.01)

(58) Field of Classification Search
CPC . H04L 67/1097; H04L 61/1511; H04L 41/00; H04L 45/306
See application file for complete search history.

(56) References Cited

U.S. PATENT DOCUMENTS

| 8,892,766 B1* | 11/2014 | Wei ..................... H04L 67/2814 706/22 |
| 9,015,318 B1* | 4/2015 | Batz ...................... H04L 12/14 709/217 |
| 9,087,189 B1* | 7/2015 | Koeten ................ H04L 41/022 |
| 2010/0235539 A1 | 9/2010 | Carter et al. |
| 2012/0023153 A1* | 1/2012 | Karasaridis ......... H04L 61/1511 709/203 |
| 2012/0102220 A1 | 4/2012 | Hopmann et al. |
| 2013/0103834 A1* | 4/2013 | Dzerve ................... H04L 67/10 709/225 |

OTHER PUBLICATIONS

Extended European Search Report received in Application No. 13192148-1505; Appliant: Huawei Technologies Co., Ltd., mailed Feb. 19, 2014, 4 pages.

* cited by examiner

*Primary Examiner* — Nicholas Taylor
*Assistant Examiner* — Afroza Sultana
(74) *Attorney, Agent, or Firm* — Slater & Matsil, L.L.P.

(57) ABSTRACT

The present invention provides a cloud service packet redirection method and system, and a cloud gateway, the method performed by the cloud gateway includes, if the cloud gateway determines that a DNS packet that is forwarded by a router in a redirection manner is a cloud service-related DNS packet, a record is maintained in a cloud IP table of the cloud gateway according to the DNS packet. Policy route configuration information is sent to the router according to the record maintained in the cloud IP table to instruct the router to maintain a policy route. The policy route instructs the router to redirect, to the cloud gateway, a cloud service packet that is indicated by the DNS packet.

10 Claims, 6 Drawing Sheets

CLOUD SERVICE PACKET REDIRECTION METHOD AND SYSTEM AND CLOUD GATEWAY

CROSS-REFERENCE TO RELATED APPLICATION

This application claims priority to Chinese Patent Application No. 201210450183.8, filed on Nov. 12, 2012, which is hereby incorporated by reference in its entirety.

TECHNICAL FIELD

Embodiments of the present invention relate to the field of network communications, and in particular, to a cloud service packet redirection method and system, and a cloud gateway.

BACKGROUND

With development of cloud computing technologies, more and more cloud service providers provide various cloud services for enterprises. For example, a cloud storage service provider provides a cheap and safe storage space for an enterprise, and a small and medium-sized enterprise may store data as required by virtue of cloud storage, so that expensive lump-sum storage hardware investment is avoided; and a cloud computing service provider provides an extensible computing resource for an enterprise, and the enterprise may increase a required computing resource according to its own business growth requirement, and so on.

When an enterprise uses a resource and a service provided by a cloud service provider, a biggest concern is that the enterprise lacks control over a cloud-side resource. To speed up using of a cloud service by an enterprise, the cloud service provider deploys a cloud gateway inside the enterprise. On the cloud gateway, the enterprise can monitor cloud service traffic and perform actions such as user access authentication, cloud resource access right management, active directory (Active Directory, AD) policy synchronization, and data encryption to ensure security for the enterprise to use the cloud service.

To implement various functions of an enterprise cloud gateway, an enterprise egress router needs to redirect cloud service traffic to the cloud gateway. In an existing cloud service packet redirection solution, the cloud gateway analyzes a Web (network) packet, distinguishes a cloud service from an ordinary webpage Web service according to domain name information of the Web packet, forwards a packet of an ordinary Web service directly, and performs further processing on a cloud service packet. Only a part of Web packets are cloud service packets, and if all Web packets are redirected to the cloud gateway simply, the cloud gateway needs to parse all the Web packets, thereby increasing a processing overhead of the cloud gateway.

SUMMARY

Embodiments of the present invention provide a cloud service packet redirection method and system, and a cloud gateway, so that the cloud gateway does not need to parse a large number of Web packets, thereby reducing a processing overhead of the cloud gateway.

In a first aspect, a cloud service packet redirection method is provided, where the method includes:

receiving, by a cloud gateway, a domain name system DNS packet that is forwarded by a router in a redirection manner; if the cloud gateway determines that the DNS packet is a cloud service-related DNS packet, maintaining, by the cloud gateway, a record in a cloud IP table of the cloud gateway according to the cloud service-related DNS packet, where one record in the cloud IP table corresponds to one or more policy routes of the router; and sending, by the cloud gateway, policy route configuration information to the router according to information of the record maintained in the cloud IP table to instruct the router to maintain a policy route, where the policy route instructs the router to redirect, to the cloud gateway, a cloud service packet that is indicated by the cloud service-related DNS packet.

In a first possible implementation manner of the first aspect, the maintaining, by the cloud gateway, a record in a cloud IP table of the cloud gateway according to the cloud service-related DNS packet is specifically implemented as follows: obtaining, by the cloud gateway, domain name information, IP address information, and DNS entry survival time information of the cloud service-related DNS packet; querying, by the cloud gateway, the record in the cloud IP table of the cloud gateway according to the domain name information and the IP address information of the cloud service-related DNS packet, where the record in the cloud IP table includes domain name information, IP address information, DNS entry survival time information, and ACL entry identifier information, and the ACL entry identifier information is used to identify a policy route of the router that corresponds to the record in the cloud IP table; if no record that corresponds to the domain name information and the IP address information of the cloud service-related DNS packet exists in the cloud IP table, adding, by the cloud gateway, a first record in the cloud IP table, where the first record includes the domain name information, the IP address information, and the DNS entry survival time information of the cloud service-related DNS packet; or if a record that corresponds to the domain name information and the IP address information of the cloud service-related DNS packet exists in the cloud IP table, updating, by the cloud gateway, DNS entry survival time information of the existing record according to the DNS entry survival time information of the cloud service-related DNS packet.

With reference to the first possible implementation manner of the first aspect, in a second possible implementation manner, the sending, by the cloud gateway, policy route configuration information to the router according to information of the record maintained in the cloud IP table to instruct the router to maintain a policy route is specifically implemented as follows: if the cloud gateway adds the first record in the cloud IP table, sending, by the cloud gateway, first policy route configuration information to the router to instruct the router to add a policy route that corresponds to the first record, where the first policy route configuration information includes action information indicating addition of the policy route, and IP address information and ACL entry identifier information of the first record.

With reference to the first aspect or the first or second possible implementation manner of the first aspect, in a third possible implementation manner, the method further includes: aging, by the cloud gateway, DNS entry survival time of all records in the cloud IP table with time; and deleting, by the cloud gateway, a second record whose DNS entry survival time is 0 in the cloud IP table.

With reference to the third possible implementation manner of the first aspect, in a fourth possible implementation manner, the sending, by the cloud gateway, policy route configuration information to the router according to information of the record maintained in the cloud IP table to instruct the router to maintain a policy route is specifically implemented as follows: if the cloud gateway deletes the second record, sending, by the cloud gateway, second policy route configuration information to the router to instruct the router to delete a policy route that corresponds to the second record, where the second policy route configuration information includes action information indicating deletion of the policy route, and IP address information and ACL entry identifier information of the second record.

In a second aspect, a cloud gateway is provided, where the cloud gateway includes: a receiving unit, adapted to receive a domain name system DNS packet that is forwarded by a router in a redirection manner; a determining unit, adapted to determine whether the DNS packet received by the receiving unit is a cloud service-related DNS packet; a maintaining unit, adapted to: if the determining unit determines that the DNS packet is a cloud service-related DNS packet, maintain a record in a cloud IP table of the cloud gateway according to the cloud service-related DNS packet, where one record in the cloud IP table corresponds to one or more policy routes of the router; and a sending unit, adapted to send policy route configuration information to the router according to information of the record maintained in the cloud IP table to instruct the router to maintain a policy route, where the policy route instructs the router to redirect, to the cloud gateway, a cloud service packet that is indicated by the cloud service-related DNS packet.

In a first possible implementation manner of the second aspect, the maintaining unit is specifically adapted to: obtain domain name information, IP address information, and DNS entry survival time information of the cloud service-related DNS packet; query the record in the cloud IP table of the cloud gateway according to the domain name information and the IP address information of the cloud service-related DNS packet, where the record in the cloud IP table includes domain name information, IP address information, DNS entry survival time information, and ACL entry identifier information, and the ACL entry identifier information is used to identify a policy route of the router that corresponds to the record in the cloud IP table; if no record that corresponds to the domain name information and the IP address information of the cloud service-related DNS packet exists in the cloud IP table, add a first record in the cloud IP table, where the first record includes the domain name information, the IP address information, and the DNS entry survival time information of the cloud service-related DNS packet; or if a record that corresponds to the domain name information and the IP address information of the cloud service-related DNS packet exists in the cloud IP table, update DNS entry survival time information of the existing record according to the DNS entry survival time information of the cloud service-related DNS packet.

With reference to the second aspect or the first possible implementation manner of the second aspect, in a second possible implementation manner, specifically, the maintaining unit is further adapted to age DNS entry survival time of all records in the cloud IP table with time, and delete a second record whose DNS entry survival time is 0 in the cloud IP table.

With reference to the second possible implementation manner of the second aspect, in a third possible implementation manner, the sending unit is specifically adapted to: if the maintaining unit adds the first record in the cloud IP table, send first policy route configuration information to the router to instruct the router to add a policy route that corresponds to the first record, where the first policy route configuration information includes action information indicating addition of the policy route, and IP address information and ACL entry identifier information of the first record; and if the maintaining unit deletes the second record, send second policy route configuration information to the router to instruct the router to delete a policy route that corresponds to the second record, where the second policy route configuration information includes action information indicating deletion of the policy route, and IP address information and ACL entry identifier information of the second record.

In a third aspect, a system is provided, where the system includes a router and the cloud gateway provided in the second aspect or in any possible implementation manner of the second aspect, where the router is adapted to forward a domain name system DNS packet to the cloud gateway in a redirection manner; and configure a policy route and redirect a cloud service packet to the cloud gateway according to the policy route.

In the embodiments of the present invention, a cloud service-related DNS packet is determined among DNS packets forwarded by a router, a cloud IP table of a cloud gateway is maintained according to the cloud service-related DNS packet, and a policy route of the router is determined according to maintenance information in the cloud IP table, so that the cloud gateway does not need to parse a large number of Web packets, thereby reducing a processing overhead of the cloud gateway.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and persons of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the embodiments to be described are merely a part rather than all of the embodiments of the present invention. All other embodiments obtained by persons of ordinary skill in the art based on the embodiments of the present invention without creative efforts shall fall within the protection scope of the present invention.

Figure 1:
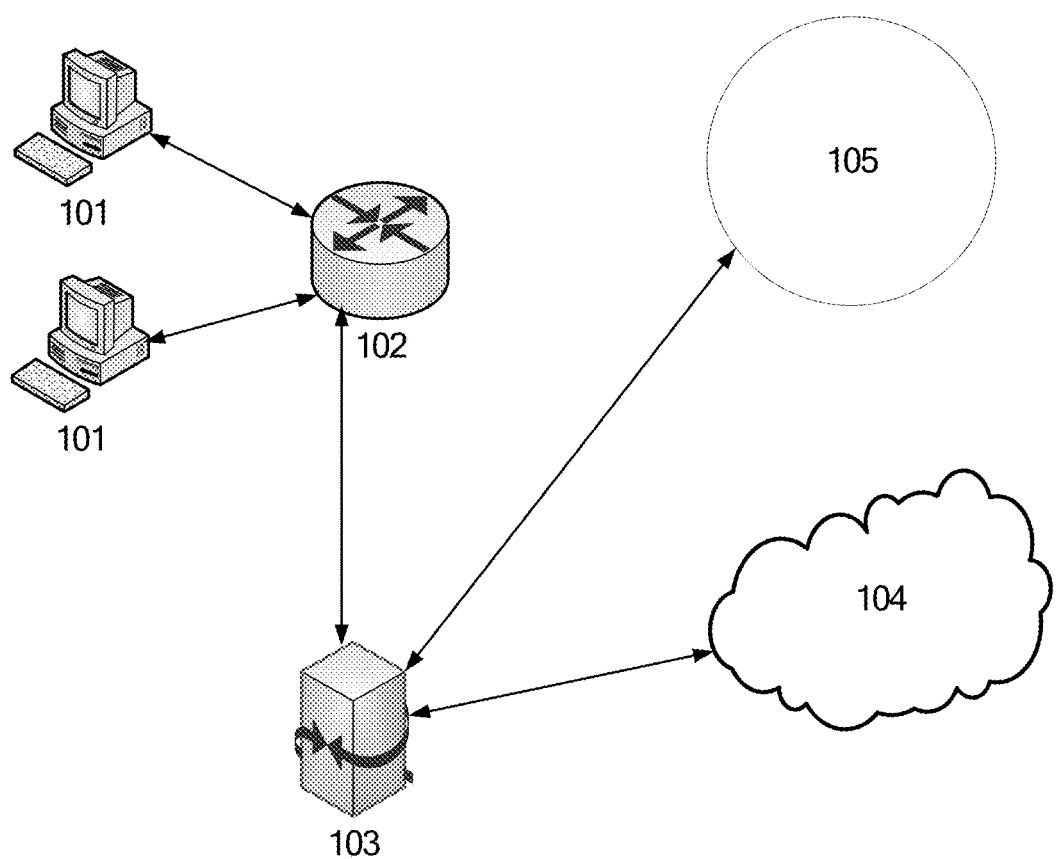
FIG. 1 is a schematic diagram of an application scenario according to an embodiment of the present invention.

FIG. 1 is a schematic diagram of an application scenario according to an embodiment of the present invention. As shown in FIG. 1, a cloud gateway 103 can monitor traffic of a cloud service, and perform user access authentication, cloud resource access right management, active directory (Active Directory, AD) policy synchronization, data encryption, and so on. A router 102 forwards a DNS packet to the cloud gateway 103 in a redirection manner for processing, where the DNS packet is sent by a user terminal 101. According to a type of a DNS packet, the cloud gateway 103 forwards an ordinary service DNS packet directly, so as to access an ordinary Web service 105; and for a cloud service-related DNS packet, the cloud gateway 103 sends policy route configuration information to the router 102 to instruct the router to configure a policy route, so as to redirect the cloud service-related packet to the cloud gateway 103 to access a cloud service-related Web service 104.

In the present invention, the method, the cloud gateway, and the system in the embodiments of the present invention may be understood with reference to the application scenario shown in FIG. 1, but the method, the cloud gateway, and the system in the embodiments of the present invention are not limited to the application scenario shown in FIG. 1.

Figure 2:
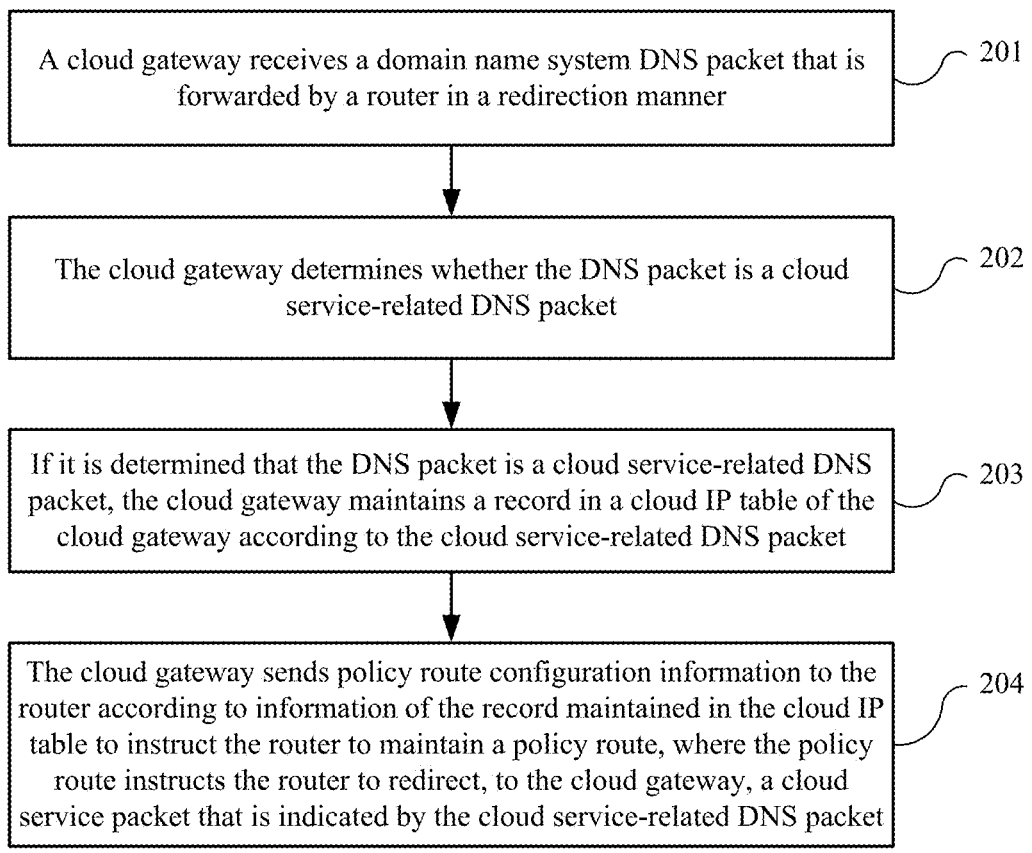
FIG. 2 is a flowchart of a cloud service packet redirection method according to an embodiment of the present invention.

FIG. 2 is a flowchart of a cloud service packet redirection method according to an embodiment of the present invention. The method is executed by a cloud gateway, and the cloud gateway may be the cloud gateway 103 shown in FIG. 1. The method includes:

201. The cloud gateway receives a domain name system (Domain Name System, DNS) packet that is forwarded by a router in a redirection manner.

The router may configure a policy route initially and redirect, to the cloud gateway, a DNS packet that passes through the router. Generally, the DNS packet is sent through a port numbered 53.

When a policy route is configured, an operation object is a route entry, and a matching object is a route, and information such as target network segment (source IP address information or destination IP address information), permit (Permit), packet protocol type, next-hop address, and port may be specifically reserved.

By configuring a policy route, the router may decide how to process a data packet that needs to be routed and decide a next-hop forwarding device of a data packet.

202. The cloud gateway determines whether the DNS packet is a cloud service-related DNS packet.

DNS packet may be a cloud service-related packet or a cloud service-unrelated packet. First, the cloud gateway needs to determine whether the DNS packet that is forwarded by the router in a redirection manner is a cloud service-related DNS packet. If the cloud gateway determines that the DNS packet is a cloud service-related DNS packet, continue to execute 203; and if the cloud gateway determines that the DNS packet is not a cloud service-related DNS packet, the cloud gateway forwards the DNS packet directly without configuring a policy route for the router.

203. If it is determined that the DNS packet is a cloud service-related DNS packet, the cloud gateway maintains a record in a cloud IP table of the cloud gateway according to the cloud service-related DNS packet.

The cloud IP table is used to record a cloud service-related DNS packet received by the cloud gateway, and one record in the cloud IP table may correspond to one or more policy routes of the router. The cloud gateway may control a policy route of the router by maintaining a record in the cloud IP table.

204. The cloud gateway sends policy route configuration information to the router according to information of the record maintained in the cloud IP table to instruct the router to maintain a policy route, where the policy route instructs the router to redirect, to the cloud gateway, a cloud service packet that is indicated by the cloud service-related DNS packet.

The router maintains the policy route according to the policy route configuration information, which may be: adding a policy route that corresponds to a record in the cloud IP table, or may be: deleting a policy route that corresponds to a record in the cloud IP table.

In the embodiment of the present invention, a cloud gateway determines a cloud service-related DNS packet among DNS packets forwarded by the router, maintains a cloud IP table of the cloud gateway according to the cloud service-related DNS packet, and determines a policy route of the router according to maintenance information in the cloud IP table, so that the cloud gateway does not need to parse a large number of Web packets, thereby reducing a processing overhead of the cloud gateway.

Optionally, in 202, that the cloud gateway determines whether the DNS packet is a cloud service-related DNS packet may specifically include: obtaining domain name information by parsing the DNS packet, and determining that the DNS packet is a cloud service-related DNS packet according to the domain name information. If the domain name information indicates that the DNS packet is a DNS packet that provides a cloud service, it may be determined that the DNS packet that provides a cloud service is the cloud service-related DNS packet.

For example, a domain name beginning with s3, such as s3.\*\*\*.com, is generally a cloud storage service domain name, and a domain name beginning with www, such as www.\*\*\*.com, is generally an ordinary Web domain name. A cloud service-related service domain name may be distinguished from an ordinary Web domain name according to the domain name information, so that a cloud service packet may be distinguished from an ordinary Web packet.

Optionally, in 203, that if it is determined that the DNS packet is a cloud service-related DNS packet, the cloud gateway maintains a record in a cloud IP table of the cloud gateway according to the cloud service-related DNS packet may specifically include: obtaining, by the cloud gateway, domain name information, Internet protocol (Internet Protocol, IP) address information, and DNS entry survival time information of the cloud service-related DNS packet; and querying, by the cloud gateway, the record in the cloud IP table of the cloud gateway according to the domain name information and the IP address information of the cloud service-related DNS packet. The record in the cloud IP table may include domain name information, IP address information, DNS entry survival time information, and access control list (Access Control List, ACL) entry identifier information, where the ACL entry identifier information is used to identify a policy route that corresponds to the record in the cloud IP table. Optionally, if no record that corresponds to the domain name information and the IP address information of the cloud service-related DNS packet exists in the cloud IP table, the cloud gateway adds a first record in the cloud IP table, where the first record includes the domain name information, the IP address information, and the DNS entry survival time information of the cloud service-related DNS packet; and optionally, if a record that corresponds to the domain name information and the IP address information of the cloud service-related DNS packet exists in the cloud IP table, the cloud gateway updates DNS entry survival time information of the existing record according to the DNS entry survival time information of the cloud service-related DNS packet.

In the present invention, entries in the cloud IP table are not limited to the aforementioned domain name information, IP address information, DNS entry survival time information, and ACL entry identifier information, and may further include other parameters required for generating policy route configuration information, which are not described herein any further.

Further, in 204, that the cloud gateway sends policy route configuration information to the router according to information of the record maintained in the cloud IP table to instruct the router to maintain a policy route may include: if the cloud gateway adds the first record in the cloud IP table, sending, by the cloud gateway, first policy route configuration information to the router to instruct the router to add a policy route that corresponds to the first record. The first policy route configuration information includes action (action) information indicating addition of the policy route, and IP address information and ACL entry identifier information of the first record.

Optionally, the method may further include: aging, by the cloud gateway, DNS entry survival time of all records in the cloud IP table with time; and deleting, by the cloud gateway, a second record whose DNS entry survival time is 0 in the cloud IP table.

Specifically, the cloud gateway progressively decreases the DNS entry survival time of all records in the cloud IP table with the aging of time, which may be implemented through an aging module, for example, a periodically executing module.

Further, in 204, that the cloud gateway sends policy route configuration information to the router according to information of the record maintained in the cloud IP table to instruct the router to maintain a policy route may include: if the cloud gateway deletes the second record, sending, by the cloud gateway, second policy route configuration information to the router to instruct the router to delete a policy route that corresponds to the second record. The second policy route configuration information includes action information indicating deletion of the policy route, and IP address information and ACL entry identifier information of the second record. A manner in which the router deletes a policy route may be that the router deletes a policy route that is related to the ACL entry identifier information of the second record among policy routes.

Optionally, the cloud IP table of the cloud gateway may further include entry information used for distinguishing routers. When parsing the DNS packet sent by the router, the cloud gateway may obtain relevant information of the router, and save the relevant information of the router in the cloud IP table. By distinguishing entry information of routers, the cloud gateway may determine a corresponding router to which the policy route configuration information is to be sent. In other words, one cloud gateway may be connected to a plurality of routers and configure policy routes on the plurality of routers. In the embodiment of the present invention, for ease of description, one router is taken as an example for description. Persons skilled in the art may understand that implementation principles of the plurality of routes are the same, which are not described herein any further.

Figure 3:
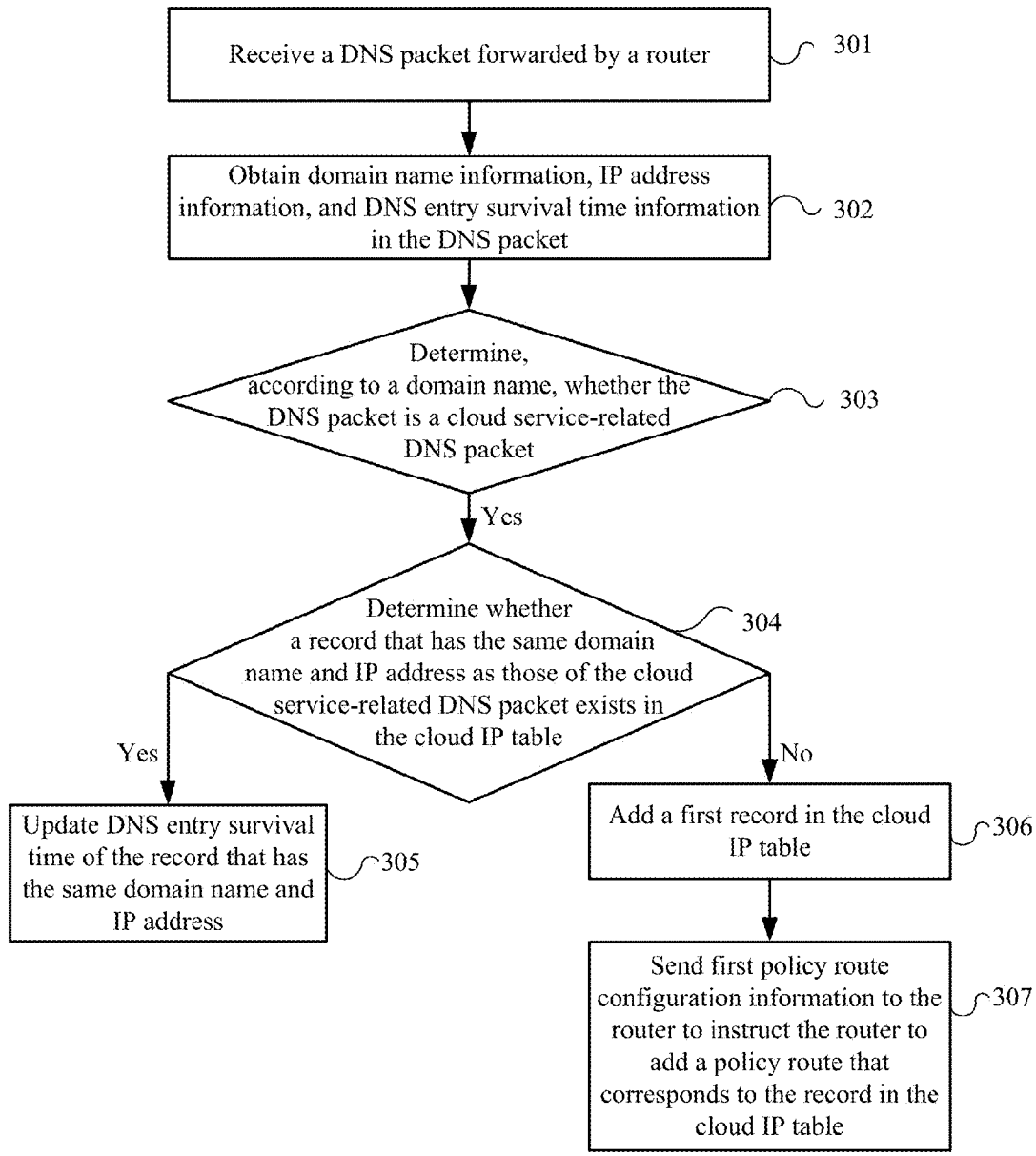
FIG. 3 is a flowchart of another cloud service packet redirection method according to an embodiment of the present invention.

FIG. 3 is a flowchart of another cloud service packet redirection method according to an embodiment of the present invention. The method is executed by a cloud gateway, and the method includes:

301. Receive a DNS packet forwarded by a router. The DNS packet may be a DNS query packet or a DNS response packet.

The router may configure a policy route initially and forward, to the cloud gateway, a DNS packet that passes through the router (which is generally a port numbered 53).

302. Obtain domain name information, IP address information, and DNS entry survival time information in the DNS packet. The domain name information, the IP address information, and the DNS entry survival time information in the DNS packet may be obtained by parsing the DNS packet.

The domain name information may be used to determine a type of the DNS packet, and the IP address information may be used to determine a source of packet information. The IP address information may be used together with the domain name information to determine a policy route used for forwarding a cloud service packet. The DNS entry survival time information may be used to determine survival time of the policy route.

303. Determine, according to a domain name, whether the DNS packet is a cloud service-related DNS packet.

Generally, a network service provider specifies a fixed domain name prefix as a domain name of a certain service. For example, a domain name beginning with s3 is generally a cloud storage service domain name. If the DNS packet is not a cloud service-related DNS packet, the cloud gateway forwards the DNS packet directly and does not need to configure a policy route, and the procedure ends; and if the DNS packet is a cloud service-related DNS packet, execute 304.

304. Determine whether a record that has the same domain name information and IP address information as those of the cloud service-related DNS packet exists in the cloud IP table. If exists, execute 305; and if does not exist, execute 306.

305. If a record that has the same domain name information and IP address information as those of the cloud service-related DNS packet exists in the cloud IP table, update DNS entry survival time of the existing record.

306. If no record that has the same domain name information and IP address information as those of the cloud service-related DNS packet exists in the cloud IP table, add a first record in the cloud IP table according to the domain name information and the IP address information of the cloud service-related DNS packet and send first policy route configuration information to the router to instruct the router to add a policy route that corresponds to the first record. Specifically, the first record may include domain name information, IP address information, and DNS entry survival time information of the cloud service-related DNS packet, and ACL entry identifier information of the first record, and the first policy route configuration information may include action information indicating addition of the policy route, and IP address information and the ACL entry identifier information of the first record. Definitely, the first policy route configuration information may further include other information, which is not limited in the embodiment of the present invention.

In the embodiment of the present invention, a cloud gateway determines a cloud service-related DNS packet through a DNS packet forwarded by a router, and when a cloud service-related DNS packet including a new domain name and a new IP address is founded, sends policy route configuration information to the router to add a new policy route.

Figure 4:
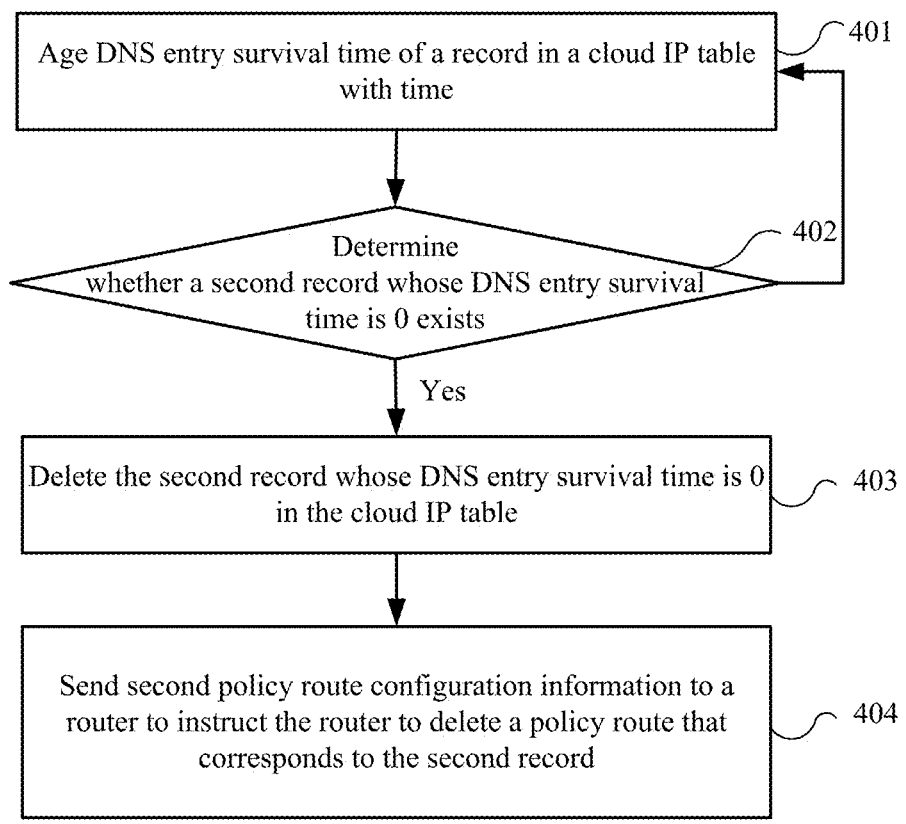
FIG. 4 is a flowchart of another cloud service packet redirection method according to an embodiment of the present invention.

FIG. 4 is a flowchart of another cloud service packet redirection method according to an embodiment of the present invention. The method is executed by a cloud gateway, and the method includes:

401. Age DNS entry survival time of all records in a cloud IP table with time.

402. Determine whether a second record whose DNS entry survival time is 0 exists.

If a second record whose DNS entry survival time is 0 exists, execute 403; and no matter whether a second record whose DNS entry survival time is 0 exists, continue to execute 401.

403. Delete the second record whose DNS entry survival time is 0 in the cloud IP table.

404. Send second policy route configuration information to a router to instruct the router to delete a policy route that corresponds to the second record. The second policy route configuration information may include action information indicating deletion of the policy route, and IP address information and ACL entry identifier information of the second record.

In the embodiment of the present invention, a cloud gateway determines, by monitoring DNS entry survival time of a record in a cloud IP table, validity time of a policy route of a router that corresponds to the record, thereby controlling survival time of the policy route of the router.

Figure 5:
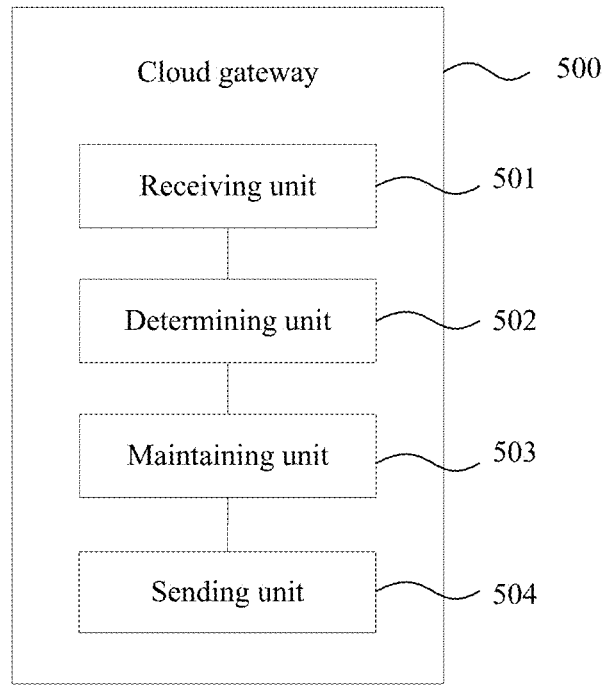
FIG. 5 is a schematic block diagram of a cloud gateway according to an embodiment of the present invention.

FIG. 5 is a schematic block diagram of a cloud gateway 500 according to an embodiment of the present invention. The cloud gateway 500 may include a receiving unit 501, a determining unit 502, a maintaining unit 503, and a sending unit 504, where:

the receiving unit 501 may receive a DNS packet that is forwarded by a router in a redirection manner;

the determining unit 502 may determine whether the DNS packet received by the receiving unit 501 is a cloud service-related DNS packet, where if yes, a record in a cloud IP table of the cloud gateway is maintained according to the cloud service-related DNS packet, and one record in the cloud IP table corresponds to one or more policy routes of the router;

the maintaining unit 503 may maintain the record in the cloud IP table of the cloud gateway according to the cloud service-related DNS packet after the determining unit 502 determines that the DNS packet is the cloud service-related DNS packet, where the cloud IP table is used to record a cloud service-related DNS packet received by the cloud gateway, one record in the cloud IP table may correspond to one or more policy routes of the router, and the cloud gateway may control a policy route of the router by maintaining a record in the cloud IP table; and the sending unit 504 may send policy route configuration information to the router according to information of the record maintained by the maintaining unit 503 in the cloud IP table to instruct the router to maintain a policy route, where the policy route instructs the router to redirect, to the cloud gateway 500, a cloud service packet that is indicated by the DNS packet.

In the embodiment of the present invention, the cloud gateway 500 determines a cloud service-related DNS packet among DNS packets forwarded by the router, maintains a cloud IP table of the cloud gateway according to the cloud service-related DNS packet, and determines a policy route of the router according to maintenance information in the cloud IP table, so that the cloud gateway does not need to parse a large number of Web packets, thereby reducing a processing overhead of the cloud gateway.

Optionally, the maintaining unit 503 may obtain domain name information, IP address information, and DNS entry survival time information of the cloud service-related DNS packet; and the maintaining unit 503 may further query the record in the cloud IP table of the cloud gateway according to the domain name information, the IP address information, and router information of the cloud service-related DNS packet, where the record in the cloud IP table includes domain name information, an IP address, DNS entry survival time, and an ACL entry identifier, and the ACL entry identifier is used to identify a policy route that corresponds to the record in the cloud IP table. Optionally, if no record that corresponds to the domain name information and the IP address information of the cloud service-related DNS packet exists in the cloud IP table, the maintaining unit 503 may further add a first record in the cloud IP table, where the first record includes the domain name information, the IP address information, and the DNS entry survival time information of the cloud service-related DNS packet; or if a record that corresponds to the domain name information and the IP address information of the cloud service-related DNS packet exists in the cloud IP table, the maintaining unit 503 may further update DNS entry survival time information of the existing record according to the DNS entry survival time information of the cloud service-related DNS packet.

Further, if the maintaining unit 503 adds the first record in the cloud IP table, the sending unit 504 may send first policy route configuration information to the router to instruct the router to add a policy route that corresponds to the first record, where the first policy route configuration information includes action information indicating addition of the policy route, and IP address information and an ACL entry identifier of the first record.

Optionally, the maintaining unit 503 may further age DNS entry survival time of all records in the cloud IP table with time; and the maintaining unit 503 may further delete a second record whose DNS entry survival time is 0 in the cloud IP table.

Further, if the maintaining unit 503 deletes the second record, the sending unit 504 may send second policy route configuration information to the router to instruct the router to delete a policy route that corresponds to the second record, where the second policy route configuration information includes action information indicating deletion of the policy route, and IP address information and an ACL entry identifier of the second record.

The cloud gateway 500 is adapted to implement the cloud service packet redirection method described in any embodiment shown in FIG. 1 to FIG. 4 in the present invention, which is not described herein any further in the present invention.

Figure 6:
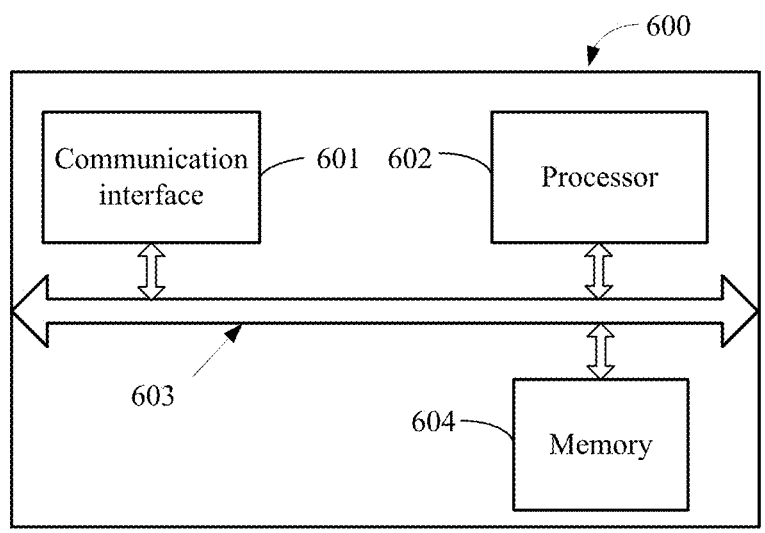
FIG. 6 is a schematic structural diagram of a cloud gateway according to an embodiment of the present invention.

FIG. 6 is a schematic structural diagram of a cloud gateway 600 according to an embodiment of the present invention. The cloud gateway 600 may include: a communication interface 601, a processor 602, a bus 603, and a memory 604.

The communication interface 601, the processor 602, and the memory 604 are interconnected through a bus 603; and the bus 603 may be an ISA bus, a PCI bus, or an EISA bus, and so on. The bus may be classified into an address bus, a data bus, a control bus, and so on. For ease of representation, in FIG. 6, only one bold line is used to represent the bus, which does not mean that there is only one bus or only one type of bus.

The memory 604 is adapted to store a program. Specifically, the program may include a program code, where the program code includes a computer operation instruction. The memory 604 may include a high-speed RAM memory and may also include a non-volatile memory (non-volatile memory), for example, at least one disk memory.

The communication interface 601 is adapted to receive a domain name system DNS packet that is forwarded by a router in a redirection manner.

The processor 602 executes the program stored in the memory 604, and is adapted to: determine whether the DNS packet is a cloud service-related DNS packet; if it is determined that the DNS packet is a cloud service-related DNS packet, maintain a record in a cloud IP table of the cloud gateway 600 according to the cloud service-related DNS packet, where one record in the cloud IP table corresponds to one or more policy routes of the router; and send policy route configuration information to the router according to information of the record maintained in the cloud IP table to instruct the router to maintain a policy route, where the policy route instructs the router to redirect, to the cloud gateway 600, a cloud service packet that is indicated by the cloud service-related DNS packet.

The memory 604 may further be adapted to store the cloud IP table.

The memory 604 may include a read-only memory and a random access memory, and provide an instruction and data for the processor 602. The memory 604 may further include a non-volatile random access memory (NVRAM).

The method disclosed in any embodiment shown in FIG. 1 to FIG. 4 in the present invention may be applied to the processor 602, or implemented by the processor 602. The processor 602 may be an integrated circuit chip that has a signal processing capability. In an implementation process, steps of the foregoing method may be implemented by an integrated logic circuit of hardware in the processor 602 or by an instruction in the form of software. The foregoing processor 602 may be a universal processor, which includes a central processing unit (Central Processing Unit, briefly referred to as CPU), a network processor (Network Processor, briefly referred to as NP), and so on; and may also be a digital signal processor (DSP), an application-specific integrated circuit (ASIC), a field programmable gate array (FPGA) or another programmable logical device, a discrete gate or a transistor logic device, or a discrete hardware component. It can implement or execute the methods, steps and logical block diagrams disclosed in the embodiments of the present invention. The universal processor may be a microprocessor or the processor may also be any common processor. The steps of the method disclosed in the embodiments of the present invention may be executed by a hardware decoding possessor directly, or by a combination of a hardware module and a software module in a decoding processor. The software module may be located in a storage medium that is mature in the art, such as a random access memory, a flash memory, a read-only memory, a programmable read-only memory, an electrically erasable programmable memory, or a register. The storage medium is located in the memory 604, and the processor 602 reads information in the memory 604 and implements the steps of the method together with hardware of the processor 602.

Optionally, the processor 602 is specifically adapted to: obtain domain name information, IP address information, and DNS entry survival time information of the cloud service-related DNS packet; query the record in the cloud IP table of the cloud gateway according to the domain name information, the IP address information, and router information of the cloud service-related DNS packet, where the record in the cloud IP table includes domain name information, an IP address, DNS entry survival time, and an ACL entry identifier, and the ACL entry identifier is used to identify a policy route of the router that corresponds to the record in the cloud IP table; if no record that corresponds to the domain name information and the IP address information of the cloud service-related DNS packet exists in the cloud IP table, add a first record in the cloud IP table, where the first record includes the domain name information, the IP address information, and the DNS entry survival time information of the cloud service-related DNS packet; and if a record that corresponds to the domain name information and the IP address information of the cloud service-related DNS packet exists in the cloud IP table, update DNS entry survival time information of the existing record according to the DNS entry survival time information of the cloud service-related DNS packet.

Further, if the first record is added in the cloud IP table, the processor 602 sends first policy route configuration information to the router to instruct the router to add a policy route that corresponds to the first record, where the first policy route configuration information includes action information indicating addition of the policy route, and IP address information and an ACL entry identifier of the first record.

Optionally, the processor 602 is further adapted to age DNS entry survival time of all records in the cloud IP table with time, and delete a second record whose DNS entry survival time is 0 in the cloud IP table.

Further, if the second record is deleted in the cloud IP table, the processor 602 sends second policy route configuration information to the router to instruct the router to delete a policy route that corresponds to the record whose DNS entry survival time is 0 in the cloud IP table, where the second policy route configuration information includes action information indicating deletion of the policy route, and IP address information and an ACL entry identifier of the second record.

The cloud gateway 600 is adapted to implement the cloud service packet redirection method described in any embodiment shown in FIG. 1 to FIG. 4 in the present invention, which is not described herein any further in the present invention.

Figure 7:
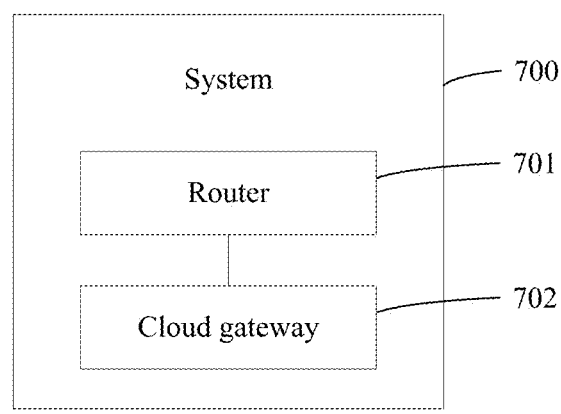
FIG. 7 is a schematic block diagram of a system according to an embodiment of the present invention.

FIG. 7 is a schematic block diagram of a cloud service packet redirection system 700 according to an embodiment of the present invention. The system shown in FIG. 7 may include a router 701 and a cloud gateway 702.

The router 701 may be adapted to forward a DNS packet to the cloud gateway 702 in a redirection manner, and configure a policy route and redirect a cloud service packet to the cloud gateway 702 according to the policy route.

The cloud gateway 702 may be the cloud gateway 500 shown in FIG. 5 or the cloud gateway 600 shown in FIG. 6, and can implement the cloud service packet redirection method described in any embodiment shown in FIG. 1 to FIG. 4 in the present invention, which is not described herein any further in the present invention.

Persons of ordinary skill in the art may be aware that, units and algorithm steps in the examples described in the embodiments disclosed in this specification can be implemented by electronic hardware, or a combination of computer software and electronic hardware. Whether these functions are performed by hardware or software depends on particular applications and design constraint conditions of the technical solutions. Persons skilled in the art may use a different method to implement the described functions for each particular application, but it should not be considered that such implementation goes beyond the scope of the present invention.

It may be clearly understood by persons skilled in the art that, for convenient and brief description, for a detailed working process of the foregoing system, apparatus, and unit, reference may be made to a corresponding process in the foregoing method embodiments, which is not described herein any further.

In the several embodiments provided in the present application, it should be understood that the disclosed system, apparatus, and method may be implemented in other manners. For example, the apparatus embodiments described in the foregoing are merely exemplary. For example, the unit division is merely logical function division and may be other division manners in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between apparatuses or units may be implemented in electronic, mechanical, or other forms.

The units described as separate parts may or may not be physically separate, and parts displayed as units may or may not be physical units, that is, may be located in one position, or may be distributed on a plurality of network units. A part or all of the units may be selected according to an actual need to achieve the objectives of the solutions in the embodiments.

In addition, functional units in the embodiments of the present invention may be integrated into one processing unit, or each of the units may exist alone physically, or two or more units may be integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or part of the technical solutions may be implemented in the form of a software product. The computer software product is stored in a storage medium, and includes several instructions used for instructing a computer device (which may be a personal computer, a server, or a network device or the like) to execute all or a part of the steps of the method described in the embodiments of the present invention. The foregoing storage medium includes: any medium that can store program codes, such as a USB flash disk, a removable hard disk, a read-only memory (ROM, Read-Only Memory), a random access memory (RAM, Random Access Memory), a magnetic disk, or an optical disk.

The foregoing descriptions are merely specific embodiments of the present invention, but are not intended to limit the protection scope of the present invention. Any variation or replacement readily figured out by persons skilled in the art within the technical scope disclosed in the present invention shall all fall within the protection scope of the present invention. Therefore, the protection scope of the present invention shall be subject to the protection scope of the claims.

What is claimed is:

1. A cloud service packet redirection method performed by a cloud gateway, the method comprising:
   receiving a domain name system (DNS) packet that is forwarded by a router in a redirection manner;
   determining that the DNS packet is a cloud service-related DNS packet;
   obtaining first domain name information, first IP address information, and first DNS entry survival time information of the cloud service-related DNS packet;
   querying a cloud IP table of the cloud gateway according to the first domain name information and the first IP address information of the cloud service-related DNS packet, wherein one record in the cloud IP table corresponds to one or more policy routes of the router, wherein a record in the cloud IP table comprises domain name information, IP address information, DNS entry survival time information, and ACL entry identifier information, wherein the ACL entry identifier information is used to identify a policy route of the router that corresponds to the record in the cloud IP table;
   adding a first record in the cloud IP table, wherein no record that corresponds to the first domain name information and the first IP address information exists in the cloud IP table and wherein the first record comprises the first domain name information, the first IP address information, and the first DNS entry survival time information of the cloud service-related DNS packet;
   sending first policy route configuration information to the router to instruct the router to add a first policy route that corresponds to the first record, wherein the first policy route configuration information comprises first action information indicating addition of the first policy route, the first IP address information, and first ACL entry identifier information of the first record; and
   updating, DNS entry survival time information of an existing record in the cloud IP table that corresponds to the domain name information and the IP address information of the cloud service-related DNS packet exists, the DNS entry survival time information being updated according to the DNS entry survival time information of the cloud service-related DNS packet.

2. The method according to claim 1, further comprising:
   aging DNS entry survival time of all records in the cloud IP table with time; and
   deleting a second record whose DNS entry survival time is 0 in the cloud IP table.

3. The method according to claim 2, further comprising:
   deleting the second record; and
   sending second policy route configuration information to the router to instruct the router to delete a second policy route that corresponds to the second record, wherein the second policy route configuration information comprises second action information indicating deletion of the second policy route, and second IP address information and second ACL entry identifier information of the second record.

4. A cloud service packet redirection method, comprising:
   receiving, by a cloud gateway, a domain name system (DNS) packet that is redirected by a router;
   determining, by the cloud gateway, that the DNS packet is a cloud service-related DNS packet;
   obtaining, by the cloud gateway, first domain name information, first IP address information, and first DNS entry survival time information of the cloud service-related DNS packet;
   querying, by the cloud gateway, a cloud IP table of the cloud gateway according to the first domain name information and the first IP address information of the cloud service-related DNS packet, wherein one record in the cloud IP table corresponds to one or more policy routes of the router, a record in the cloud IP table comprises domain name information, IP address information, DNS entry survival time information, and ACL entry identifier information, wherein the ACL entry identifier information is used to identify a policy route of the router that corresponds to the record in the cloud IP table;
   updating, by the cloud gateway, DNS entry survival time information of an existing record according to the first DNS entry survival time information of the cloud service-related DNS packet when a record that corresponds to the domain name information and the IP address information of the cloud service-related DNS packet exists in the cloud IP table;
   adding, by the cloud gateway, a first record in the cloud IP table when no record that corresponds to the first domain name information and the first IP address information of the cloud service-related DNS packet exists in the cloud IP table, wherein the first record comprises the first domain name information, the first IP address information, and the first DNS entry survival time information of the cloud service-related DNS packet; and
   sending, by the cloud gateway, first policy route configuration information to the router to instruct the router to add a first policy route that corresponds to the first record, wherein the first policy route configuration information comprises first action information indicating addition of the first policy route, the first IP address information, and first ACL entry identifier information of the first record.

5. The method according to claim 4, further comprising:
aging, by the cloud gateway, DNS entry survival time of all records in the cloud IP table with time; and
deleting, by the cloud gateway, a second record whose DNS entry survival time is 0 in the cloud IP table.

6. The method according to claim 5, further comprising sending, by the cloud gateway, second policy route configuration information to the router to instruct the router to delete a second policy route that corresponds to the second record, wherein the second policy route configuration information comprises second action information indicating deletion of the second policy route, and second IP address information and second ACL entry identifier information of the second record.

7. A cloud gateway, comprising:
a processor and a memory storing instructions, the processor being configured to execute the instructions to perform operations of:
  receiving a domain name system (DNS) packet that is redirected by a router;
  determining that the DNS packet is a cloud service-related DNS packet;
  obtaining first domain name information, first IP address information, and first DNS entry survival time information of the cloud service-related DNS packet;
  querying a cloud IP table of the cloud gateway according to the first domain name information and the first IP address information of the cloud service-related DNS packet, wherein one record in the cloud IP table corresponds to one or more policy routes of the router, a record in the cloud IP table comprises domain name information, IP address information, DNS entry survival time information, and ACL entry identifier information, wherein the ACL entry identifier information is used to identify a policy route of the router that corresponds to the record in the cloud IP table;
  updating DNS entry survival time information of an existing record according to the first DNS entry survival time information of the cloud service-related DNS packet when a record that corresponds to the domain name information and the IP address information of the cloud service-related DNS packet exists in the cloud IP table; and
  adding a first record in the cloud IP table when no record that corresponds to the first domain name information and the first IP address information of the cloud service-related DNS packet exists in the cloud IP table, wherein the first record comprises the first domain name information, the first IP address information, and the first DNS entry survival time information of the cloud service-related DNS packet, and sending first policy route configuration information to the router to instruct the router to add a first policy route that corresponds to the first record, wherein the first policy route configuration information comprises: first action information indicating addition of the first policy route, the first IP address information, and first ACL entry identifier information of the first record.

8. The cloud gateway according to claim 7, wherein the processor is further configured to execute the instructions to perform operations of:
  aging DNS entry survival time of all records in the cloud IP table with time; and
  deleting, by the cloud gateway, a second record whose DNS entry survival time is 0 in the cloud IP table.

9. The cloud gateway according to claim 8, wherein the processor is further configured to execute the instructions to perform operations of sending second policy route configuration information to the router to instruct the router to delete a second policy route that corresponds to the second record, wherein the second policy route configuration information comprises: second action information indicating deletion of the second policy route, and second IP address information and second ACL entry identifier information of the second record.

10. A cloud packet redirection system, comprising:
a router; and
a cloud gateway coupled to the router, the cloud gateway comprising a computing hardware configured to:
  receive a domain name system (DNS) packet that is redirected by a router;
  determine that the DNS packet is a cloud service-related DNS packet;
  obtain first domain name information, first IP address information, and first DNS entry survival time information of the cloud service-related DNS packet;
  query the cloud IP table of the cloud gateway according to the first domain name information and the first IP address information of the cloud service-related DNS packet, wherein one record in a cloud IP table corresponds to one or more policy routes of the router, a record in the cloud IP table comprises domain name information, IP address information, DNS entry survival time information, and ACL entry identifier information, wherein the ACL entry identifier information is used to identify a policy route of the router that corresponds to the record in the cloud IP table;
  update DNS entry survival time information of an existing record according to the first DNS entry survival time information of the cloud service-related DNS packet when a record that corresponds to the domain name information and the IP address information of the cloud service-related DNS packet exists in the cloud IP table; and
  add a first record in the cloud IP table when no record that corresponds to the first domain name information and the first IP address information of the cloud service-related DNS packet exists in the cloud IP table, wherein the first record comprises the first domain name information, the first IP address information, and the first DNS entry survival time information of the cloud service-related DNS packet, and send first policy route configuration information to the router to instruct the router to add a first policy route that corresponds to the first record, wherein the first policy route configuration information comprises: first action information indicating addition of the first policy route, the first IP address information, and first ACL entry identifier information of the first record; and
wherein the router comprises computing hardware and configured to redirect the domain name system (DNS) packet to the cloud gateway, to configure the first policy route, and to redirect a cloud service packet to the cloud gateway according to the first policy route.

* * * * *